(12) United States Patent  
Smart et al.

(10) Patent No.: US 7,894,843 B2  
(45) Date of Patent: Feb. 22, 2011

(54) HANDHELD COMPUTER FOR EMERGENCY RESPONDERS

(76) Inventors: David A. Smart, 75 Geiger La., Warren, NJ (US) 07059; Paul B. Smart, 1232 Prospect Dr., Wilmington, DE (US) 19809

( * ) Notice: Subject to any disclaimer, the term of this patent is extended or adjusted under 35 U.S.C. 154(b) by 618 days.

(21) Appl. No.: 12/010,230

(22) Filed: Jan. 23, 2008

(65) Prior Publication Data

US 2009/0186647 A1    Jul. 23, 2009

(51) Int. Cl.
    *H04B 7/00* (2006.01)
(52) U.S. Cl. .............................. 455/521; 362/12; 362/18
(58) Field of Classification Search ................. 455/521; 368/12, 10; 235/472.01
    See application file for complete search history.

(56) References Cited

U.S. PATENT DOCUMENTS

| | | | |
|---|---|---|---|
| 4,819,139 A | 4/1989 | Thomas | |
| 5,815,417 A | 9/1998 | Orr et al. | |
| 6,456,695 B2 * | 9/2002 | Lee | ............................. 379/41 |
| 6,556,904 B1 | 4/2003 | Larson et al. | |
| 6,882,706 B2 | 4/2005 | Andrew | |
| 7,280,038 B2 | 10/2007 | Robinson | |
| 7,304,787 B2 | 12/2007 | Whitesides et al. | |
| 7,312,916 B2 | 12/2007 | Pullen et al. | |
| 2002/0103622 A1 | 8/2002 | Burge | |
| 2005/0157853 A1 | 7/2005 | Andrew | |
| 2006/0015368 A1 * | 1/2006 | Hockey | ......................... 705/2 |
| 2006/0212195 A1 | 9/2006 | Veith et al. | |
| 2007/0103288 A1 | 5/2007 | Herard Jr. | |
| 2007/0105528 A1 | 5/2007 | Haas et al. | |
| 2007/0218869 A1 | 9/2007 | Thijs et al. | |
| 2009/0158423 A1 * | 6/2009 | Orlassino et al. | .............. 726/19 |

OTHER PUBLICATIONS

Moditech Website, "Crash Recovery System" www.moditech.com/rescue.

* cited by examiner

*Primary Examiner*—Ahshik Kim  
(74) *Attorney, Agent, or Firm*—Thomas J. Germinario

(57) ABSTRACT

A compact handheld notebook computer using flash memory to store, retrieve and display information needed by emergency responders is designed for prolonged use under severe conditions and utilizes an electrophoretic display to conserve energy and provide a high resolution display more readable than LCD displays.

20 Claims, 2 Drawing Sheets

HANDHELD COMPUTER FOR EMERGENCY RESPONDERS

FIELD OF THE INVENTION

This invention relates to handheld computers used to store, retrieve and display information useful to emergency response personnel at the scene of an automobile accident, explosion, fire, flood, violent crime, terrorist attack, natural catastrophe, or other life-threatening circumstances. More particularly, this invention relates to compact handheld computers which are able to withstand hostile environments and function reliably in extreme conditions such as often occur in emergency situations.

BACKGROUND OF THE INVENTION

For first responders at the scene an emergency, the difference between saving a life and being too late is often only a matter of minutes, or even seconds. First responders need quick access to information to enable them to deal safely with the situations they encounter. For example, a responder at the scene of an automobile accident may have to cut into a vehicle and extricate an injured occupant. In that situation, the responder will need to know the location of hazardous items, such as fuel tanks, fuel lines, air bags, batteries, which may explode if a torch is applied in the wrong place. The need exists, therefore, to equip emergency responders with a handheld computer with which they can quickly access data to enable them to perform their life-saving tasks safely.

A number of U.S. patents and published patent applications describe computer systems used for acquiring and distributing emergency response information. Examples are Orr et al., U.S. Pat. No. 5,815,417, Burge, Pub. No. US2002/0103622, Andrew, U.S. Pat. No. 6,882,706, Andrew, Pub. No. US2005/0157853, Veith et al., Pub. No. US2006/0212195, Robinson, U.S. Pat. No. 7,280,038, Herard, Jr., Pub. No. US2007/0103288, Haas et al., Pub. No. US2007/0105528, and Thijs et al., Pub. No. US2007/0218869. Since these systems utilize a central server and network to gather and distribute data from responders at the emergency scene, they rely on wireless communications links that may not be available at the emergency scene or may have been disrupted by catastrophic events. Similarly, Larson et al., U.S. Pat. No. 6,556,904, describes a computer system for sending motor vehicle data from a remote server to a local computer. But here again the system depends on network accessibility to operate. These network-based systems also involve substantial costs in terms of server equipment and network administration.

In the marketplace there are software packages that run on personal computers and provide information useful to emergency responders. One example is the Crash Recovery System (CRS) software offered by the Dutch company Moditech. The CRS software can be installed in a conventional laptop or tablet personal computer. It accepts vehicle identification input either by make/model/year or by license plate number (utilizing the national DOT database). The CRS system displays top and side views of the vehicle indicating location of body components, safety features and potentially hazardous components, along with directions for safely removing and/or disabling such components.

But several factors limit the utility of such software systems at the scene of an emergency. General purpose personal computers, even those of the portable varieties, are not so compact that they will not interfere with the mobility of an emergency responder, who may need to climb, crawl or swim, depending on the circumstances. General purpose personal computers are also too delicate to function reliably in hostile environments. Such computers require volatile dynamic RAM memory (DRAM), which can only be provided by disk drives. Since disk drives are notoriously vulnerable to shocks and vibrations, they cannot be relied upon in turbulent emergency situations. Disk drives also use a lot of energy, which either results in short battery life or requires large, heavy batteries. The high rate of energy consumption by personal computers with disk-drive RAM also necessitates heat-dissipating fans, which clog and cause overheating in dusty environments.

Another source of high energy consumption in general purpose personal computers is the display. The volatile, light-emitting displays of such computers, based on LCD or CRT technology, require a continuous supply of energy to maintain the displayed images. LCD displays suitable for portable computing devices suffer from limited resolution and constrained viewing angle, and such displays are obscured in strong ambient light, such as direct sunlight or a fire's glare. The lack of fine resolution capability is a particular drawback for a very compact computer display.

Like the network-based systems, the software-based systems for emergency response data involve high costs of computer equipment and maintenance.

Therefore, the prior art in this field affords no compact computer device with the characteristics that would make it suitable for use at the scene of an emergency. The requisite characteristics include:

Low equipment and maintenance costs
Compact, lightweight, mobile and rugged hardware
Low energy demand enabling prolonged use with light-weight batteries
Ability to withstand extreme temperature, pressure, moisture, smoke, dust and/or kinetic shock
Fast and reliable access to needed data The present invention addresses these requirements by providing a compact hand-held computer device having the following features:

A small notebook-type configuration with a keypad and display screen
No disk drives, only flash memory
Simple operating system handling keypad input and display functions
Embedded operating system and single-application software stored in flash memory
Single-application software for reading a digital database and displaying text and graphics
USB port(s) for plug-in flash memory modules
Various emergency database packets stored on multiple plug-in flash memory modules in HTML format
Electrophoretic display with high resolution, viewable at wide angles and in direct sunlight, with minimal power consumption
Optional data connectivity using third generation telecommunications standard, such as GSM, UMTS or EVDO The key features that make the present invention suitable for use by emergency responders are the flash memory and electrophoretic display. Unlike DRAM, flash memory is non-volatile, which means no electrical power is needed to maintain the data stored on the chip. This enables the responder to operate the device in the field for many hours without the need for either cumbersome batteries or frequent battery replacement/recharging. Flash memory also enables fast access to stored data and much better kinetic shock resistance than disk-drive memory. These features enable the emergency responder to retrieve safety data quickly and to avoid hard-drive failures when the computer is jostled around in chaotic circumstances. Flash memory is also durable and able to withstand intense pressure, extreme temperature, and immersion in water, all of which are conditions likely to occur at an emergency scene.

To complement the energy-conserving non-volatile flash memory, the present invention uses an energy-conserving non-volatile electrophoretic display (EPD). EPDs form images by electrophoretic motion of charged pigment particles. They provide high contrast, high resolution images comparable to a printed page. Unlike LCDs, EPDs are viewable in direct sunlight at nearly any angle, and they require no power to maintain the displayed image. EPDs are widely used in "E-Book" reading devices, such as the iRex iLiad and the Amazon Kindle. Because they lack the rapid refresh rate of LCDs, EPDs are not suitable for video applications, which explains why they are not used in general purpose personal computers. But they are ideal for viewing static text and graphic images, which is all the present invention requires.

SUMMARY OF THE INVENTION

An object of the present invention is to provide a compact, light-weight, inexpensive, easy-to-use computer designed specifically to store, retrieve and display information pertaining to hazards encountered by emergency responders and to methods for safely dealing with such hazards.

Another object of the present invention is to provide a handheld emergency response computer that is able to withstand extreme conditions of temperature, pressure, humidity/moisture, dust, smoke, corrosive fumes, and vibration and operate reliably for long periods in such hostile environments.

A further object of the present invention is to provide a handheld emergency response computer that can operate reliably for extended periods of time without the need for heavy batteries or frequent battery replacement/recharging.

Yet another object of the present invention is to provide a handheld emergency response computer that does not require volatile disk-drive memory, but instead uses non-volatile flash memory, which requires less energy and is well adapted to harsh environments.

Yet a further object of the present invention is to provide a handheld emergency response computer that has a simple embedded operating system sufficient to handle keypad input and display functions and to run one application software that retrieves and displays safety data from a digital database.

Still another object of the present invention is to provide a handheld emergency response computer that accesses various interchangeable packets of safety data stored on plug-in flash memory modules.

Still a further object of the present invention is to provide a handheld emergency response computer having a compact, high resolution, non-volatile EPD display screen, which conserves energy and is readable in direct light.

All of the foregoing and many other beneficial objectives are achieved by the unique features of the present invention. In its external structure, the computer has a compact notebook configuration, comprising two panels attached together by a hinge. The two panels consist of a display panel hingeably attached to a keyboard panel. When the notebook is open, the keyboard panel is oriented horizontally and the display panel is oriented vertically. The display panel has an obverse face containing a display screen and a reverse face consisting of a hardened shell of durable, corrosion-resistant plastic. The keyboard panel has an obverse face containing a keypad and a reverse face consisting of a hardened shell of durable, corrosion-resistant plastic. A resilient sealing strip is provided along the periphery of the obverse face of the keyboard panel, such that when the panels are closed together, the sealing strip forms a secure, continuous seal that protects the obverse faces of both panels from exposure to harmful elements. A latch mechanism with cooperating components on the obverse faces of both panels secures the panels together when closed. Connected to one or both of the reverse faces of the two panels are one or more lanyard attachments, whereby the closed computer can be attached to a garment, strap or belt of the emergency responder in order to free both of their hands for other tasks.

In the panels are components of computer hardware comprising the display, the keypad, one or more embedded flash memory modules, and one or more USB ports and/or SD card slots. The display screen utilizes an electrophoretic medium of the type described in a number of patents assigned to E Ink Corporation, including U.S. Pat. Nos. 7,304,787 and 7,312,916, and the various patents referenced therein. The keypad is of the sealed membrane type in order to endure harsh environments. The keypad has a full set of alphanumeric keys in standard QWERTY style and a point-and-click device.

In the panels are also components of computer software comprising an embedded operating system (OS) and single-application software, both of which reside in the embedded flash memory module(s). On a plurality of plug-in flash memory modules are stored packets of various types of safety data in digital database format. By way of example, one such packet could contain information and graphics on how to handle hazardous materials, while another packet could contain information and graphics on how to contain and extinguish certain types of fires. When the appropriate flash memory module in plugged in to one of the USB port and/or SD card slots, the emergency responder can retrieve needed information by typing in keywords or clicking on a menu hyperlink.

Safety information stored on any one of the plug-in flash memory modules is periodically updated by: (i) downloading updated information to a personal computer from a central databank or website, (ii) plugging the flash memory module into one of the USB ports or SD card slots of the personal computer, and (iii) transferring the updated information from the personal computer to the flash memory module.

In one embodiment of the present invention, the computer hardware also includes a telecommunications module capable of high-speed data transmission and reception, using standards such as third-generation GSM, UMTS or EVDO. This feature enables multiple emergency responders to exchange information at the emergency scene or to access data from a remote central databank.

Optionally, the present invention also includes an internal bar-code reader, of the type known the art, and a laser bar-code scanner that can be plugged into one of the USB ports. This feature enables the computer to access bar-coded data relating to vehicles, such a VIN numbers, or bar-coded data regarding hazardous materials at the emergency scene.

Optionally, the present invention also includes a combination storage rack and battery charger, which can be installed in the cab of an emergency response vehicle so as to provide quick access to the computer and keep it fully charged and ready for use. This computer rack-charger operates on the same principles as dashboard-mounted flashlight receptacle-chargers that are known in the art, such as Thomas, U.S. Pat. No. 4,819,139.

The benefits and capabilities of the present invention will be more fully understood by referring to the drawings and the detailed description of the preferred embodiment which follow.

DETAILED DESCRIPTION OF THE PREFERRED EMBODIMENT

Figure 1:
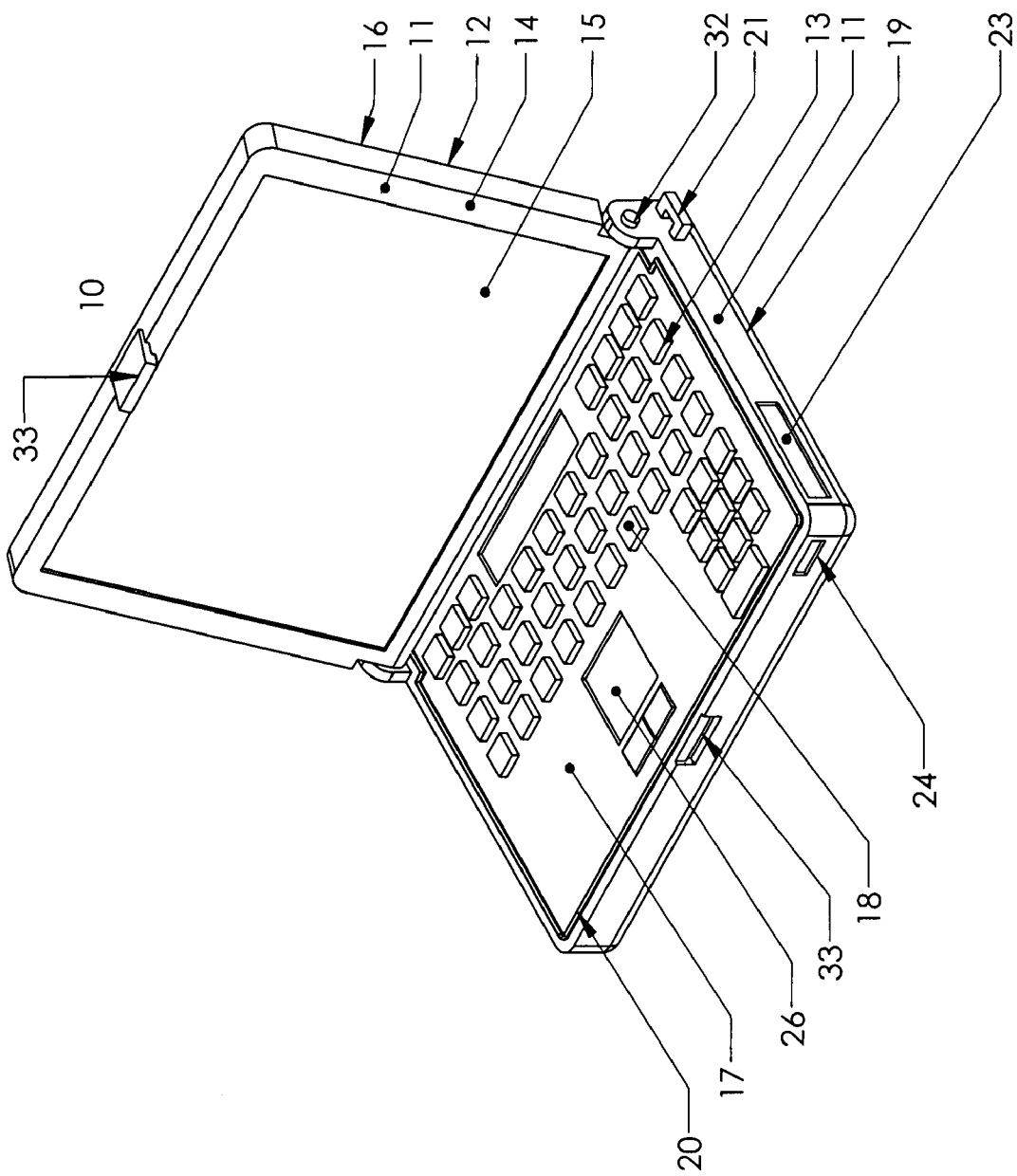
FIG. 1 is a perspective obverse view of the preferred embodiment of the present invention.

Referring to FIG. 1, the preferred embodiment of the present invention 10 has a compact notebook configuration, comprising two panels 11 attached together by a hinge 32. The two panels 11 consist of a display panel 12 hingeably attached to a keyboard panel 13. When the notebook is open, the keyboard panel 13 is oriented horizontally and the display panel 12 is oriented vertically. The display panel 12 has an obverse face 14 containing a display screen 15 and a reverse face 16 consisting of a hardened shell of durable, corrosion-resistant plastic. The keyboard panel 13 has an obverse face 17 containing a keypad 18 and a reverse face 19 consisting of a hardened shell of durable, corrosion-resistant plastic. A resilient sealing strip 20 is provided along the periphery of the obverse face 17 of the keyboard panel 13, such that when the panels 11 are closed together the sealing strip 20 forms a secure, continuous seal that protects the obverse faces 14 17 of both panels 11 from exposure to harmful elements. A latch mechanism 33 with cooperating components on the obverse faces 14 17 of both panels 11 secures the panels together when closed. Connected to one or both of the reverse faces 16 19 of the two panels 11 are one or more lanyard attachments 21, whereby the closed computer can be attached to a garment, strap or belt of the emergency responder in order to free both of their hands for other tasks.

In the panels 11 are components of computer hardware comprising the display screen 15, the keypad 18, one or more embedded flash memory modules 23, and one or more USB ports and/or SD card slots 24. The display screen 15 utilizes an electrophoretic medium of the type described in a number of patents assigned to E Ink Corporation, including U.S. Pat. Nos. 7,304,787 and 7,312,916, and the various patents referenced therein. The keypad 18 is of the sealed membrane type in order to endure harsh environments. The keypad 18 has a full set of alphanumeric keys 25 in standard QWERTY style and a point-and-click device 26.

Figure 2:
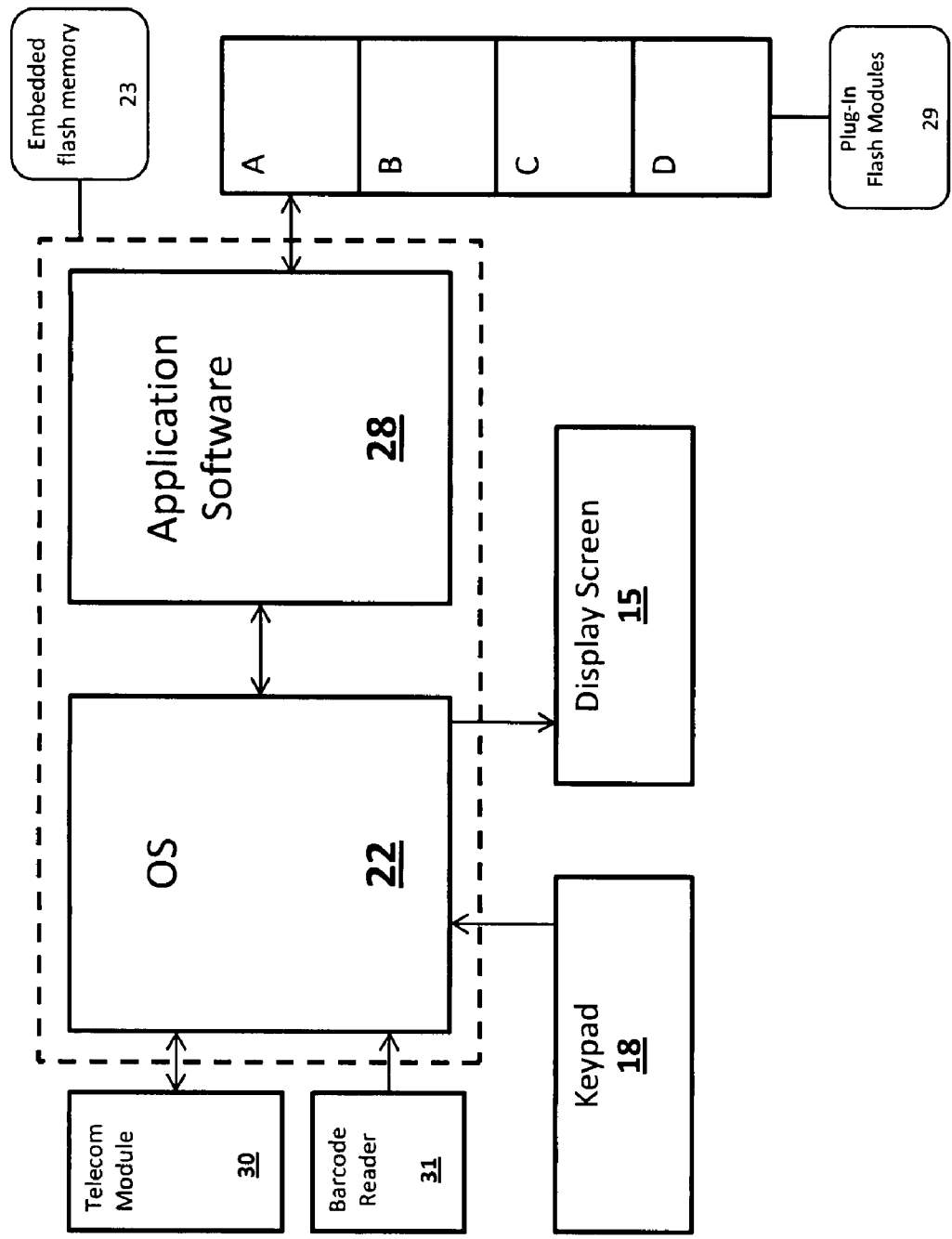
FIG. 2 is a block diagram showing the hardware and software configuration in accordance with the preferred embodiment of the present invention.

Referring to FIG. 1 and FIG. 2, the panels 11 also contain components of computer software comprising an embedded operating system (OS) 22 and single-application software 28, both of which reside in the embedded flash memory module(s) 23. On a plurality of plug-in flash memory modules 29 are stored packets of various types of safety data in digital database format (labeled A, B, C and D in FIG. 2). By way of example, one such packet could contain information and graphics on how to handle hazardous materials, while another packet could contain information and graphics on how to contain and extinguish certain types of fires. When the appropriate flash memory module 29 is plugged in to one of the USB ports and/or SD card slots 24, the emergency responder can retrieve needed information by typing in keywords using the alphanumeric keys 25 or clicking on a menu link using the point-and-click device 26.

Safety information stored on any one of the plug-in USB flash memory modules 29 is periodically updated by: (i) downloading updated information to a personal computer (not shown) from a central databank or website, (ii) plugging the flash memory module 29 into one of the USB ports or SD card slots of the personal computer, and (iii) transferring the updated information from the personal computer to the flash memory module 29.

In one embodiment of the present invention, the computer hardware also includes a telecommunications module 30 capable of high-speed data transmission and reception, using standards such as third-generation GSM, UMTS or EVDO. This feature enables multiple emergency responders to exchange information at the emergency scene or to access data from a remote central databank.

Optionally, the present invention also includes an internal bar-code reader 31, of the type known the art, and a laser bar-code scanner (not shown) that can be plugged into one of the USB ports. This feature enables the computer to access bar-coded data relating to vehicles, such a VIN numbers, or bar-coded data regarding hazardous materials at the emergency scene.

Optionally, the present invention also includes a combination storage rack and battery charger (not shown), which can be installed in the cab of an emergency response vehicle so as to provide quick access to the computer and keep it fully charged and ready for use.

To illustrate how an emergency responder would use the present invention, let us consider an accident scene in which an unconscious, injured driver is pinned inside his wrecked automobile. The responder needs to extricate the driver so that first aid can be administered and so that the driver may be placed in an ambulance. But to extricate the driver safely, the responder needs to know the location of various vehicle hazards, such as fuel tanks, un-inflated airbags, etc. On one of the plug-in flash memory modules 29 is a data packet containing hazard information for various types of motor vehicles. The responder plugs this module 29 into one of the USB ports or SD card slots 24, whereupon the operating system 27 recognizes the module 29 and opens the application software 28 to read and display its contents. If the responder is able to identify the vehicle's make, model and year by inspection, he can key in the identification or click on a menu hyperlink. If the responder cannot identify the vehicle by inspection but can read the license plate or VIN numbers, he can use the telecommunications module 30 to access a vehicle registration databank. Alternately, he can obtain the VIN number of the vehicle using the bar-code reader 31 if the vehicle has VIN bar-codes.

Once the appropriate vehicle identification is entered, the display screen 15 will show one or more views of the vehicle indicating the locations of critical hazard items such as fuel tanks, batteries, airbags, etc. The high resolution of the EPD display 15 makes the graphic display readable despite its compact size. The keypad 18 enables the responder to zoom in on graphic details of each hazard item. Each of the hazard items also has a hyperlink label, which the responder can click on to obtain further information. If, for example, he notices that one of the airbags has not deployed, he can click on the hyperlink for the airbag and obtain instructions on how to safely disable it.

While this invention has been described with reference to a specific embodiment, the description is not to be construed in a limiting sense. Various modifications of the disclosed embodiment, as well other embodiments of the invention, will be apparent to persons skilled in the art upon reference to this description. It is therefore contemplated that the appended claims will cover any such modifications or embodiments that fall within the true scope of this invention.

What is claimed is:

1. A compact computer comprising:
   (a) a keypad having a plurality of alphanumeric keys, one or more function keys, and a point-and-click device;
   (b) a display screen capable of displaying static text and graphics;
   (c) an internal power source;
   (d) one or more USB ports and/or SD card slots;
   (e) one or more flash memory modules that are plugged into the USB port(s) and/or SD card slots, on which flash memory modules are stored safety information in digital database format; and
   (f) one or more embedded flash memory modules, on which are stored an embedded operating system and an application software, such that the operating system responds to input from the keypad by activating the application software to retrieve the information stored on the flash memory module and to display the information on the display screen.

2. The compact computer according to claim 1, wherein the keypad is part of an obverse face of a keyboard panel, a reverse face of which comprises a hard shell of durable, corrosion resistant plastic, and wherein the display screen is part of an obverse face of a display panel, a reverse face of which comprises a hard shell of durable, corrosion resistant plastic, and wherein the keyboard panel and the display panel are hingeably attached to one another and are secured to one another in a closed position by a latch mechanism, such that the external structure of the compact computer is that of a notebook, and such that when the compact computer is open, the keyboard panel is oriented horizontally and the display panel is oriented vertically.

3. The compact computer according to claim 2, wherein one or more resilient sealing strips are provided along the periphery of the obverse face of the keyboard panel and/or along the periphery of the obverse face of the display panel, such that when the keyboard and display panels are closed together, the sealing strips form a secure, continuous seal that protects the obverse faces of both panels from exposure to harmful elements.

4. The compact computer according to claim 3, wherein there are, affixed to the reverse face of the display panel and/or the keyboard panel, one or more lanyard attachments, whereby the compact computer, when not in use, can be attached to a securing means, such as a garment, a strap, a cord, a thong or a belt, and can thus be carried in a hands-free mode.

5. The compact computer according to any one of claims 1-4, wherein the safety information stored in digital database format on the flash memory modules relates to emergency situations and/or provides instructions as to how to safely deal with emergency situations.

6. The compact computer according to any one of claims 1-4, wherein the keypad is a sealed membrane keypad capable of operating in harsh environments.

7. The compact computer according to claim 5, wherein the keypad is a sealed membrane keypad capable of operating in harsh environments.

8. A compact computer comprising:
   (a) a keypad having a plurality of alphanumeric keys, one or more function keys, and a point-and-click device;
   (b) an electrophoretic display screen capable of displaying high-resolution static text and graphics;
   (c) an internal power source comprising one or more rechargeable batteries;
   (d) one or more USB ports and/or SD card slots;
   (e) one or more flash and/or proprietary memory modules that are plugged into the USB port(s) and/or SD card slots, on which memory modules is stored safety information in a digital database, which information relates to emergency situations and/or provides instructions as to how to safely deal with emergency situations; and
   (f) one or more embedded flash memory modules, on which are stored an embedded operating system and an application software, such that the operating system responds to input from the keypad by activating the application software to query the database and retrieve the information stored on the memory module and to display the information on the display screen within a purpose-written application or webpage served by a locally running web-server.

9. The compact computer according to claim 8, wherein the keypad is part of an obverse face of a keyboard panel, a reverse face of which comprises a hard shell of durable, corrosion resistant plastic, and wherein the display screen is part of an obverse face of a display panel, a reverse face of which comprises a hard shell of durable, corrosion resistant plastic, and wherein the keyboard panel and the display panel are hingeably attached to one another and are secured to one another in a closed position by a latch mechanism, such that the external structure of the compact computer is that of a notebook, and such that when the compact computer is open, the keyboard panel is oriented horizontally and the display panel is oriented vertically.

10. The compact computer according to claim 9, wherein the function keys are used in conjunction with the point-and-click device to control the size of one or more selected details of text and/or graphics on the display screen, so as to zoom in or zoom out on the selected details.

11. The compact computer according to claim 10, wherein one or more resilient sealing strips are provided along the periphery of the obverse face of the keyboard panel and/or along the periphery of the obverse face of the display panel, such that when the keyboard and display panels are closed together, the sealing strips form a secure, continuous seal that protects the obverse faces of both panels from exposure to harmful elements.

12. The compact computer according to claim 11, wherein there are, affixed to the reverse face of the display panel and/or the keyboard panel, one or more lanyard attachments, whereby the compact computer, when not in use, can be attached to a securing means, such as a garment, a strap, a cord, a thong or a belt, and can thus be carried in a hands-free mode.

13. The compact computer according to any one of claims 8-12, wherein the keypad is a sealed membrane keypad capable of operating in harsh environments.

14. A compact computer comprising:
   (a) a sealed-membrane keypad having a plurality of alphanumeric keys, one or more function keys, and a point-and-click device;
   (b) an electrophoretic display screen capable of displaying high-resolution static text and graphics;
   (d) an internal power source comprising one or more rechargeable batteries;
   (e) one or more USB ports and/or SD card slots;
   (f) one or more flash memory modules that are plugged into the USB port(s) and/or SD card slots, on which USB flash memory modules are stored safety information in digital database format, which information relates to emergency situations and/or provides instructions as to how to safely deal with emergency situations;

(g) one or more embedded flash memory modules, on which are stored an embedded operating system and an application software, such that the operating system responds to input from the keypad by activating the application software to retrieve the information stored on the flash memory module and to display the information on the display screen; and (f) a telecommunications module capable of high-speed data transmission and reception, such that data from the internet or from remote computers can be downloaded and displayed on the display screen.

15. The compact computer according to claim 14, wherein the keypad is part of an obverse face of a keyboard panel, a reverse face of which comprises a hard shell of durable, corrosion resistant plastic, and wherein the display screen is part of an obverse face of a display panel, a reverse face of which comprises a hard shell of durable, corrosion resistant plastic, and wherein the keyboard panel and the display panel are hingeably attached to one another and one secured to one another in a closed position by a latch mechanism, such that the external structure of the compact computer is that of a notebook, and such that when the compact computer is open, the keyboard panel is oriented horizontally and the display panel is oriented vertically.

16. The compact computer according to claim 15, wherein the function keys are used in conjunction with the point-and-click device to control the size of one or more selected details of text and/or graphics on the display screen, so as to zoom in or zoom out on the selected details.

17. The compact computer according to claim 16, wherein one or more resilient sealing strips are provided along the periphery of the obverse face of the keyboard panel and/or along the periphery of the obverse face of the display panel, such that when the keyboard and display panels are closed together, the sealing strips form a secure, continuous seal that protects the obverse faces of both panels from exposure to harmful elements.

18. The compact computer according to claim 17, wherein there are, affixed to the reverse face of the display panel and/or the keyboard panel, one or more lanyard attachments, whereby the compact computer, when not in use, can be attached to a securing means, such as a garment, a strap, a cord, a thong or a belt, and can thus be carried in a hands-free mode.

19. The compact computer according to claim 18, further comprising an internal bar-code reader that can be connected to a bar-code scanner through one of the USB ports, such that the bar-code reader converts bar-coded data into an alphanumeric input that can be processed by the operating system and displayed on the display screen.

20. The compact computer according to claim 19, further comprising a combination storage rack and battery charger, which is installed in a vehicle having a vehicular battery, such that the compact computer, when not in use, is cradled in the storage rack and the rechargeable batteries of the compact computer are charged through an electrical connection from the vehicular battery to the combination storage rack and battery charger.

* * * * *